(12) United States Patent
Bosquet et al.

(10) Patent No.: US 10,933,695 B2
(45) Date of Patent: Mar. 2, 2021

(54) PNEUMATIC TIRE COMPRISING REINFORCING ELEMENTS IN THE FORM OF MULTI-LAYER TAPES

(71) Applicant: COMPAGNIE GENERALE DES ETABLISSEMENTS MICHELIN, Clermont-Ferrand (FR)

(72) Inventors: Augustin Bosquet, Clermont-Ferrand (FR); Jacky Pineau, Clermont-Ferrand (FR); Thomas Guy, Clermont-Ferrand (FR); Christophe Le Clerc, Clermont-Ferrand (FR); Anne-Lise Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 435 days.

(21) Appl. No.: 15/746,238

(22) PCT Filed: Jul. 19, 2016

(86) PCT No.: PCT/IB2016/054277
§ 371 (c)(1),
(2) Date: Jan. 19, 2018

(87) PCT Pub. No.: WO2017/013575
PCT Pub. Date: Jan. 26, 2017

(65) Prior Publication Data
US 2018/0207987 A1    Jul. 26, 2018

(30) Foreign Application Priority Data
Jul. 21, 2015    (FR) ..................................... 15/01545

(51) Int. Cl.
*B60C 9/18*    (2006.01)
*B60C 9/22*    (2006.01)
*B60C 9/00*    (2006.01)

(52) U.S. Cl.
CPC ............ *B60C 9/2204* (2013.01); *B60C 9/005* (2013.01); *B60C 9/0042* (2013.01);
(Continued)

(58) Field of Classification Search
CPC    B60C 9/18; B60C 9/20; B60C 9/2003; B60C 2009/1828; B60C 2009/2035; B60C 2009/2051
See application file for complete search history.

(56) References Cited

U.S. PATENT DOCUMENTS 5,437,321 A * 8/1995 Breny .................... B60C 9/2204
152/454
5,837,077 A 11/1998 Kabe et al. .................... 152/527
(Continued)

FOREIGN PATENT DOCUMENTS

DE    19716179 A1 * 10/1998 ............. B32B 25/02
DE    102013101252 A1 * 8/2014 ............... F16G 1/10
(Continued)

OTHER PUBLICATIONS

International Search Report issued by WIPO dated Oct. 28, 2016, in connection with International Application No. PCT/IB2016/054277 (with English translation attached).
(Continued)

*Primary Examiner* — Justin R Fischer
*Assistant Examiner* — Cedrick S Williams
(74) *Attorney, Agent, or Firm* — Venable LLP

(57) ABSTRACT

A tire includes a carcass ply, two beads, two sidewalls, and a crown reinforcing zone. The carcass ply connects the two beads by way of the two sidewalls. The crown reinforcing
(Continued)

zone is positioned radially external to the carcass ply. The crown reinforcing zone includes a plurality of reinforcing strips disposed in at least two layers. The reinforcing strips are coated in an elastomeric composition. A mean overlap between the reinforcing strips of the two layers is greater than 40%. The reinforcing strips are made of a thermoplastic film having a modulus greater than 0.9 GPa, and preferably greater than 2 GPa, in a main direction and in a transverse direction.

13 Claims, 2 Drawing Sheets

(52) U.S. Cl.
CPC .......... B60C 9/0064 (2013.01); B60C 9/1821 (2013.01); *B60C 2009/2214* (2013.01); *B60C 2009/2242* (2013.01); *B60C 2009/2261* (2013.01)

(56) References Cited

U.S. PATENT DOCUMENTS

| | | | |
|---|---|---|---|
| 8,960,252 B2 | 2/2015 | Deal | 152/526 |
| 9,751,364 B2 | 9/2017 | Huyghe et al. | B60C 1/00 |
| 9,902,204 B2 | 2/2018 | Lardjane et al. | B60C 9/0042 |
| 2005/0016650 A1* | 1/2005 | Durel | B60C 1/0016 152/209.1 |
| 2012/0090756 A1 | 4/2012 | Le Clerc | 152/527 |
| 2013/0199691 A1* | 8/2013 | Cercy | B60C 9/18 152/556 |
| 2014/0045983 A1 | 2/2014 | Abad et al. | B60C 9/0042 |
| 2015/0013873 A1 | 1/2015 | Lardjane et al. | 152/527 |
| 2017/0021672 A1 | 1/2017 | Doisneau et al. | B60C 9/30 |

FOREIGN PATENT DOCUMENTS

| | | |
|---|---|---|
| EP | 0 101 400 A2 | 2/1984 |
| FR | 2 964 906 A1 | 3/2012 |
| JP | 2002-187408 A | 7/2002 |
| WO | WO 2010/115860 A1 | 10/2010 |
| WO | WO 2010/115861 A1 | 10/2010 |
| WO | WO 2012/104281 A1 | 8/2012 |

OTHER PUBLICATIONS

Written Opinion published by WIPO on Jan. 26, 2017, in connection with International Application No. PCT/IB2016/054277 (in French; no English translation presently is available).

* cited by examiner

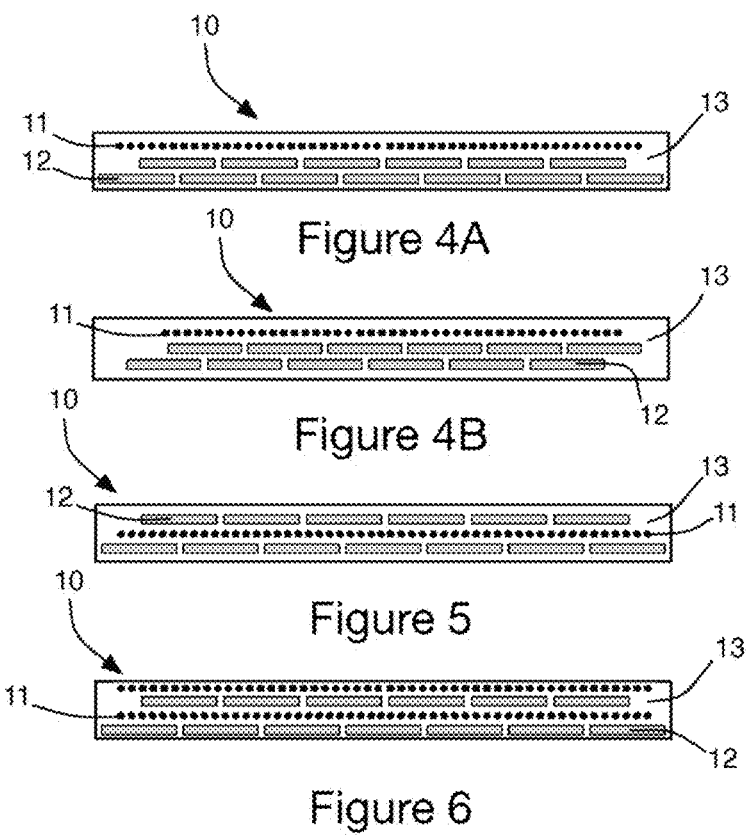
Figure 4A
Figure 4B
Figure 5
Figure 6
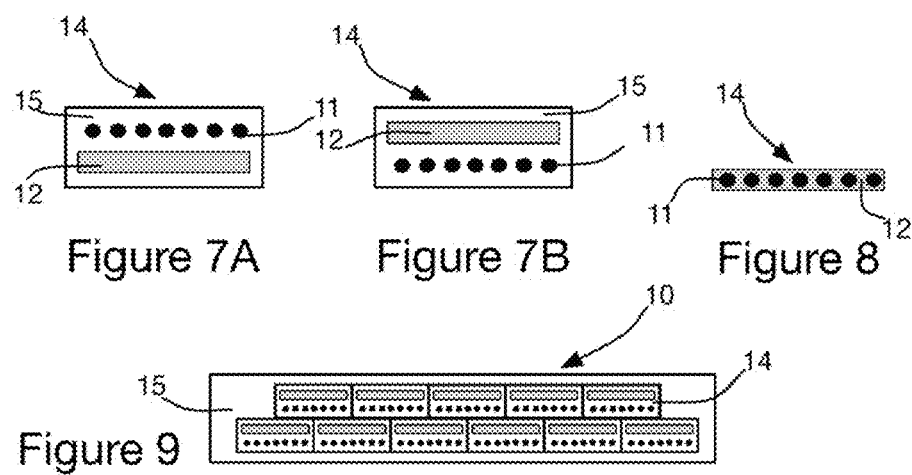
Figure 7A   Figure 7B   Figure 8
Figure 9

PNEUMATIC TIRE COMPRISING REINFORCING ELEMENTS IN THE FORM OF MULTI-LAYER TAPES

TECHNICAL FIELD OF THE INVENTION

The present invention relates to tire reinforcing elements. It relates more particularly to tire crown architectural elements.

PRIOR ART

Radial-carcass tires, commonly referred to as "radial tires", have gradually become established in the majority of markets, and in particular the market for passenger vehicle tires. This success is due in particular to the qualities of endurance, comfort, lightness of weight and low rolling resistance that radial tires have to offer.

Radial tires are essentially made up of flexible sidewalls and a stiffer crown, the sidewalls extending radially from the beads to the shoulders, the shoulders delimiting the crown, the crown bearing the tread of the tire. Since each of these parts of the tire has its own functions, the reinforcement thereof is also specific. One characteristic of radial tire technology is that it makes it possible to precisely adapt the reinforcement of each of these parts in a relatively independent manner.

In a known manner, the crown reinforcement of a passenger vehicle radial tire (commonly referred to as "passenger vehicle tire") comprises the following elements:
- a radial carcass reinforcement formed of (generally textile) reinforcing elements that connect the two beads of the tire;
- two crossed crown triangulation layers (or plies) that consist essentially of (generally metal) reinforcing elements that each make an angle of about 30 degrees with the circumferential direction of the tire;
- a crown belt that consists essentially of reinforcing elements virtually parallel to the circumferential direction of the tire, often referred to as 0 degree reinforcing elements even though they generally make a non-zero angle with the circumferential direction, for example an angle of between 0 and 10 degrees.

Put simply, the carcass has the primary function of containing the internal pressure of the tire, the crossed plies have the primary function of giving the tire its cornering stiffness, and the crown belt has the primary function of withstanding crown centrifugation at high speed. Moreover, the cooperation of all of these reinforcement elements creates what is known as the "crown triangulation". It is this triangulation which gives the tire its capacity to maintain a relatively cylindrical shape under the various stresses.

Each of these crown reinforcement elements is generally associated with elastomeric mixtures by calendering. The stack of these elements is then joined together during the vulcanization of the tire.

After several decades of research, progress and optimization of the radial tire architecture, it is the combination of all of these reinforcement elements (carcass, crossed layers, belts) that allows the radial tire to achieve the undeniable comfort, longevity and cost performance that has made it the success it is. Throughout this development, attempts have been made to improve the performance of the tires, for example in terms of their mass and their rolling resistance. Thus the crown of radial tires has gradually been reduced in thickness as increasingly high-performance reinforcing elements have been adopted and increasingly thinner layers of calendering rubber have been used so that tires that are as light as possible can be manufactured.

The document WO2010115860 describes a passenger vehicle tire in which the crown reinforcement is made up of three distinct and separate elements: a radial carcass reinforcement made of reinforcing elements that connect the two beads of the tire, a crown belt essentially made up of reinforcing elements parallel to the circumferential direction of the tire, and a triangulation crown layer essentially made up of reinforcing elements that make an angle with the circumference of the tire. Such an architecture has numerous advantages from the point of view of the performance of the tire, but involves a complicated manufacturing process with numerous steps. Finally, the number of sub-layers that are present limits the potential savings in terms of mass.

Other types of arrangement of crown reinforcing elements are also known. For example, the document U.S. Pat. No. 5,837,077 describes a tire having a belt. The tire belt is formed by winding a continuous band several times in a spiral, with the lateral part of the tubular section flattened, outside the carcass layer, in the circumferential direction of the tire and over a width corresponding to the width of the layer of the belt. This continuous band is made up of a plurality of reinforcing threads arranged in a tubular configuration and covered with rubber so as to form a structure with two superposed layers, namely an upper layer and a lower layer, and also has a core inserted between these two layers, the reinforcing threads of the two layers crossing one another. This continuous band can be formed by arranging a plurality of reinforcing threads (for example steel cords or threads), preferably 5 to 100 threads, in a tubular shape, then by twisting the set of threads at a predetermined angle with respect to the longitudinal direction, then by covering the tubular rubber assembly, then by inserting the core into the tubular element, and finally by flattening the tubular element in its longitudinal direction.

The document describes a circumferential strip comprising reinforcing threads coated in elastomeric materials. The strip initially has an ovalized profile, requiring a step of mechanical treatment before the profile is flattened. This embodiment is particularly complicated and expensive to produce.

The document EP0101400 describes a radial tire having a plurality of semi-rigid annular bands disposed in a crown portion of the tire. The bands extend substantially through the tread part of the tire. According to one particular embodiment, the tread comprises a central band reinforcement structure and two side bands. The bands each comprise fibrous reinforcing elements incorporated in an epoxy resin matrix, forming a semi-rigid hoop structure. The bands are relatively wide, independently of one another, and made of fibres embedded in an epoxy resin matrix.

The invention provides various technical means for remedying these various drawbacks, notably the complexity of production.

SUMMARY OF THE INVENTION

First of all, a first object of the invention is to make it possible to reduce the mass of the crown and thus of passenger vehicle tires, without reducing the performance thereof.

Another object of the invention consists in providing an arrangement of crown reinforcing elements that are able to be shaped in a wide range of variants, thereby making it possible to adapt the characteristics of the crown depending on the type of tire.

Another objective of the invention consists in simplifying the manufacturing process of the tires, in particular in the region of the crown.

To this end, the invention provides a tire comprising a carcass ply that connects two beads by way of two sidewalls, said carcass ply being surmounted radially on the outside by a crown reinforcing zone, itself radially on the inside of a tread, said crown reinforcing zone comprising a plurality of reinforcing strips disposed in at least two layers, a first layer radially on the inside and a second layer radially on the outside, said strips of said first and second layers being disposed in a juxtaposed manner in a substantially circumferential direction, said strips being coated in an elastomeric composition, characterized in that the mean overlap between the strips of the two layers is greater than 40%, and in that the reinforcing strips are made of a thermoplastic film having a modulus greater than 0.9 GPa and preferably greater than 2 GPa in the main direction and in the transverse direction.

Such an architecture makes it possible to simplify the crown zone of the tire, to obtain a more compact reinforcing zone while providing significant reductions in weight. The manufacturing method of the tire is simplified by the elimination of the traditional crown and triangulation plies, which require relatively tedious cutting and positioning steps. Finally, this architecture makes it possible to reduce the rolling resistance on account of the simplified, optimized and thinner arrangement.

According to one advantageous embodiment, the length/width and width/thickness aspect ratio of the thermoplastic film is greater than or equal to 5.

According to one advantageous embodiment, the thermoplastic film is made of thermally stabilized biaxially or monoaxially drawn polyester or of polyamide.

According to another advantageous embodiment, the strips are integrated in a matrix made of an elastomeric mixture, preferably a diene elastomeric mixture.

In one exemplary embodiment, the elastomeric mixture of the matrix has a modulus at 10% elongation of between 3 and 20 MPa.

In another exemplary embodiment, the elastomeric mixture of the matrix has a modulus at 10% elongation of greater than 20 MPa.

According to another advantageous embodiment, the matrix of elastomeric mixture comprises circumferential filamentary reinforcing elements integrated in said matrix.

In a variant, the strips comprise circumferential filamentary reinforcing elements integrated in the thermoplastic film of which the strip is made.

According to yet another variant embodiment, the strips are of the composite type and comprise a thermoplastic film and an alignment of reinforcing threads arranged in the vicinity of the thermoplastic film, the whole being integrated in a matrix of elastomeric mixture, preferably diene elastomeric mixture.

Advantageously, the interface between the strips and the matrix elastomeric mixture provides an adhesive element.

The strips are disposed side by side to form an alignment. The tire according to the invention advantageously comprises at least two alignments of strips.

DESCRIPTION OF THE FIGURES

All the embodiment details are given in the description which follows, which is supplemented by FIGS. 1 to 9, which are given solely by way of non-limiting examples and in which:

FIG. 4A is a schematic depiction of another example of a crown reinforcing element having an alignment of textile reinforcing cords and two alignments of thermoplastic strips;

FIG. 4B is a schematic depiction of another example of a crown reinforcing element according to the invention, made up of an alignment of textile reinforcing cords and two alignments of thermoplastic strips;

FIG. 5 is a schematic depiction of an example of a crown reinforcing element having alignments of strips disposed on either side of a row of textile reinforcing cords;

FIG. 6 is a schematic depiction of an example of a crown reinforcing element made up of alignments of textile reinforcing cords and thermoplastic strips, disposed in alternation;

FIG. 7A is a schematic depiction of an example of a composite strip according to the invention, made up of textile reinforcing cords, thermoplastic strips and a diene matrix;

FIG. 7B is a schematic depiction of a variant of a composite strip, in which the arrangement of textile cords and thermoplastic strips is reversed;

FIG. 8 is a schematic depiction of a two-element composite strip in which the textile reinforcing cords are integrated in a thermoplastic strip;

FIG. 9 is a schematic depiction of an example of a tire crown reinforcing element in which composite strips are aligned.

DETAILED DESCRIPTION OF THE INVENTION

Definitions

In the present document, the expression "overlap of the strips" means an arrangement in which the strips of a radially outer layer overlap the strips of the radially inner layer, that is to say that the projection in the radial direction of one strip onto the strip at a lower level is not zero. The percentage of overlap may vary depending on the embodiment. This overlap forms a linkage between the layers, creating cohesion of the whole of the reinforcing zone of the crown. This linkage allows in particular transmission of shear forces between the layers.

A "longitudinal direction" or "circumferential direction" means a direction which corresponds to the periphery of the tire and which is defined by the direction in which the tire rolls.

An "axial direction" means a direction parallel to the rolling axis of the tire.

The expression "Shore A hardness" means the hardness of the compositions after curing, which is assessed in accordance with the ASTM D 2240-86 standard.

A "tire" means all types of resilient tread, whether or not it is subjected to an internal pressure.

The "tread" of a tire means a quantity of elastomeric mixture delimited by lateral surfaces and by two main surfaces, one of which is intended to come into contact with a road surface when the tire is being driven on.

The "sidewall" of a tire means a lateral surface of the tire, said surface being disposed between the tread of the tire and a bead of this tire.

The "bead" of a tire means a part of the tire that is intended to be seated on a wheel rim.

In the present document, a "carcass", or "carcass ply", means a reinforcing structure for a tire in the form of a layer made up of a matrix of elastomeric material in which filaments or threads, generally textile, are arranged in a substantially parallel and longitudinal alignment. The carcass ply is advantageously manufactured flat, in great lengths, then cut to the appropriate dimensions for the manufacture of a tire to which the carcass ply is suited.

The nominal secant moduli (or apparent stress, in MPa) are measured in second elongation (i.e. after an accommodation cycle at the extension rate provided for the measurement itself) at 10% elongation (denoted MA 10) and at 100% elongation (denoted MA 100) at 23° C.±2° C., and under normal hygrometry conditions.

Figure 1:
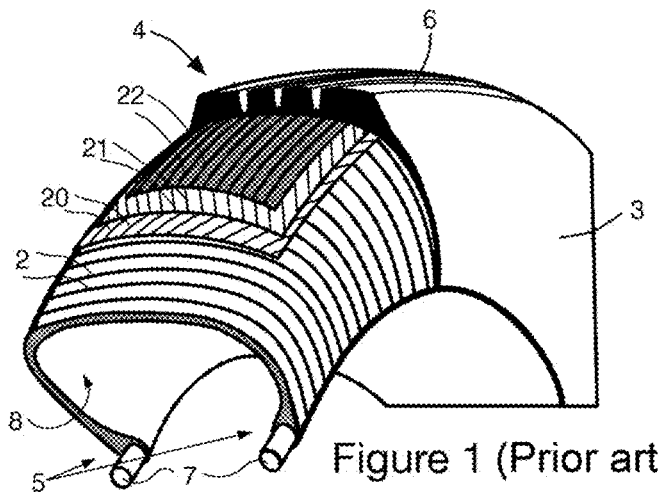
FIG. 1 is a schematic perspective depiction of a tire according to the prior art.

FIG. 1 illustrates a perspective view of a passenger vehicle tire, partially cut away layer by layer, according to the prior art. A carcass reinforcement 2 connected to the beads 5 about bead wires 7 extends along the sidewalls 3 and the crown 4. The carcass reinforcement 2 is formed of radially oriented reinforcing elements. The reinforcing elements are textile cords (for example made of nylon, rayon, polyester). At the crown of the tire, the carcass is surmounted by two crossed triangulation layers 20, 21 and a belt 22. The two crossed crown triangulation layers 20, 21 comprise reinforcing elements oriented at an angle of substantially between 20 and 40 degrees on either side of the circumferential direction of the tire. The reinforcing elements of the crossed layers generally form metal cords. A layer 8 of sealing elastomeric mixture covers the internal cavity of the tire. A tread 6 surmounts the whole. This architecture involves several semi-finished layers, requiring a manufacturing method with numerous intermediate steps. The numerous layers render the tire relatively heavy.

Figure 2:
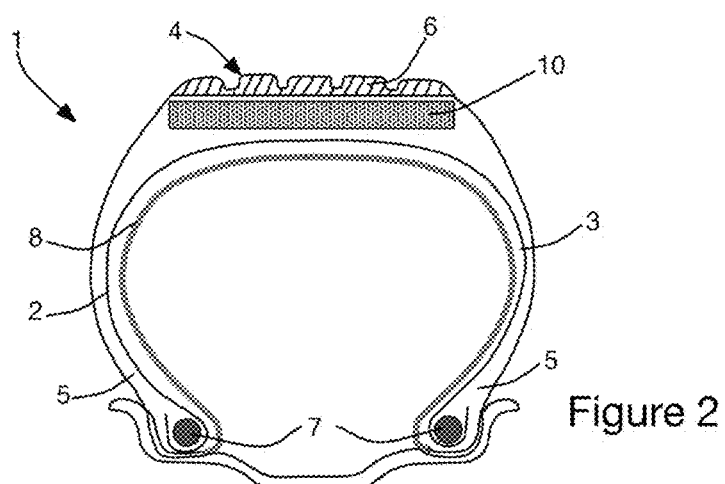
FIG. 2 is a sectional view of a tire according to the invention.

FIG. 2 shows a tire 1 according to the invention, comprising sidewalls 3 surmounted by a crown 4 and a carcass 2 extending from one bead 5 to the other, passing via the sidewalls 3 and the crown 4. At the crown 4, more specifically between the carcass 2 and the tread 6, the tire provides a crown reinforcing zone 10 provided with circumferential strips, that is to say strips oriented substantially at 0° with respect to the circumferential direction. Various embodiments of the strips are described below with regard to FIGS. 3 to 9.

Embodiments of the Strips

Figure 3A:
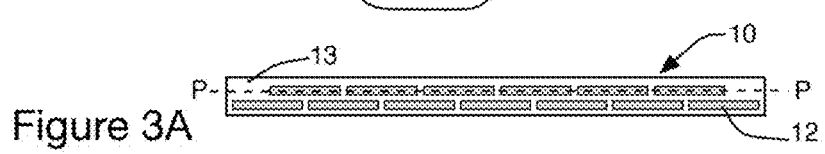
FIG. 3A is a schematic depiction of an example of a tire crown reinforcing element according to the invention, having alignments of strips.
Figure 3B:
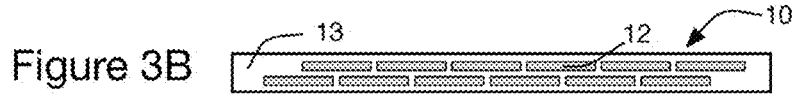
FIG. 3B is a schematic depiction of another example of a tire crown reinforcing element according to the invention, having alignments of strips.

FIGS. 3A and 3B illustrate a first embodiment of a crown zone 10 according to the invention. According to this embodiment, the strips 12 made of a thermoplastic film are disposed side by side at an angle substantially in the region of 0 degree, and more broadly at an angle less than substantially 12 degrees to the circumferential direction. The whole is embedded in a matrix 13 made up of an elastomeric mixture, preferably a diene elastomeric mixture. The staggered arrangement of the strips is realized for example by first traverse winding starting at a given azimuth, and second traverse winding starting at 180 degrees. In a variant, the strips are positioned by first traverse winding in a given axial direction, followed by second traverse winding in the opposite axial direction.

In the exemplary embodiment in FIG. 3A, with a symmetrical disposition, two rows of strips are arranged with a lateral offset between the positions of the strips of the two rows of around half a pitch of the strip. The main plane P-P of each row is substantially axial. Such an arrangement has the effect of covering the bridges of elastomeric mixture of the first row with the strips that make up the second row. The bridges of elastomeric mixture between the strips of the first row are thus positioned substantially at the middle of the respective widths of the strips of the adjacent layer. In this example, the radially outer layer has one fewer winding in order to compensate for the effect of the lateral offset. The mean overlap between the strips of the two rows is at least 20% and preferably greater than 40%.

The exemplary embodiment in FIG. 3B has two rows of the same width, one of which is offset with respect to the other, in order to produce a tire having asymmetric characteristics.

In a variant, the starting and end points of the layers may optionally be the same in order to ensure a certain uniformity.

FIGS. 4A and 4B illustrate variant embodiments of FIGS. 3A and 3B that comprise, in addition to the above-described rows of strips, an alignment of reinforcing threads 11 provided in a radially outer position. The threads 11 are preferably textile threads. In addition to providing a certain stiffness, the circumferential threads make it possible to protect the radially inner layers.

FIG. 5 illustrates a variant of the example in FIG. 4A, in which the alignment of threads 11 is provided between the two rows of strips 12.

FIG. 6 illustrates another variant of the example in FIG. 4A, in which the alignment of threads 11 in a radially outer position is supplemented by a second alignment of threads 11 provided between the two rows of strips 12 in order to further stiffen the crown zone.

Composite Strips

A second embodiment of the strips is presented with regard to FIGS. 7A, 7B and 8. FIG. 7A illustrates an exemplary embodiment in which a thermoplastic film 12 as described above is surmounted by a row 11 of reinforcing threads, preferably textile. The whole is embedded in a matrix 15 made up of an elastomeric mixture, preferably a diene elastomeric mixture, and forms a composite strip 14. FIG. 7B presents a variant composite strip 14 with a reverse geometry, the row of threads being arranged radially on the inside with respect to the thermoplastic film.

FIG. 8 illustrates a third example of a composite strip in which a row of reinforcing threads 11 is integrated directly into a thermoplastic film. This variant has the additional advantages of greater lightness of weight and very high compactness.

FIG. 9 illustrates a staggered disposition of the composite strips 14. In this example, two rows of composite strips are provided, the radially outer row being the narrowest.

The composite strips make it possible to simplify the steps of manufacturing the crown zone of the tire. By altering only the type of strip, without changing the other architectural elements of the tire, the composite strips make it possible to vary the characteristics of the crown zone depending on needs, providing greater flexibility in the design of tires.

For each of the abovementioned embodiments, different parameters can be altered, such as the relative width of the constituent elements, different widths in different layers, the thicknesses of the components, the number of alignments of strips, which may be greater than two, in particular for specific tires such as for heavy-duty vehicles, all-terrain vehicles or for aircraft.

Constituent Elements and Materials

The thermoplastic film of the reinforcing strips 12 is advantageously produced with the aid of materials selected from the following: thermally stabilized biaxially or monoaxially drawn polyester, polyamide (for example nylon 6.6). In a variant, these materials can be loaded with isotropic or anisotropic inclusions or inclusions of fibrillar form.

The strips 12 of thermoplastic film have a ratio between the dimensions length/width and width/thickness of greater than or equal to 5. The thermoplastic film has a modulus in the main direction (corresponding to the circumferential direction of the tire) and the transverse direction of greater than 0.9 GPa and preferably greater than 2 GPa.

The matrix 13 or 15 in which the strips 12 or 14 are integrated is made up of an elastomeric mixture, preferably a diene elastomeric mixture, having a modulus at 10% elongation that is conventional (typically between 3 and 20 MPa), or preferably stiff (that is to say greater than 20 MPa). A suitable adhesive system according to the nature of the reinforcing elements and the mixtures can be used in order to obtain the necessary cohesion. This adhesive system is obtained for example by physical or chemical preparation or activation of the surfaces and then by using an adhesive.

The reinforcing cords 11 are made up of materials selected from the following: aramid, polyester (PET, PEN, PTT), nylon, rayon, polyketone, metal thread or cord, or composite thread of cord (glass or carbon with resin), or a hybrid reinforcing element made up of a combination of the above materials.

Table 1 below illustrates an example of results obtained using architectures according to the features of the invention. At size 175/65R14, a reference with a crown having two crown plies and a layer of nylon threads oriented at 0° is compared with a variant within the scope of the invention that is made of two layers of PET strips with a width of 15 mm and a thickness of 0.5 mm, laid in staggered rows. Each strip is separated from its neighbour by 1 mm. A diene mixture with a thickness of 0.3 mm separates the two layers of PET strip, this embodiment also being supplemented by a 0° PET 440×3 thread (variant 1) or an aramid thread (variant 2).

TABLE 1 comparison of masses, cornering stiffness and rolling resistance for tires according to the invention, with reference to a control tire of conventional architecture.

|  | Mass | D(Z) at 0.8ZETRTO and 2.4 bar | RRt |
| --- | --- | --- | --- |
| Reference | — | 100% | — |
| Variant 1 | −270 g/ref | 108% | −0.55 kg/T/ref |
| Variant 2 | −450 g/ref | 108% | −0.35 kg/T/ref |

Significant improvements in mass and rolling resistance obtained with the embodiments according to the invention are observed.

REFERENCE NUMERALS EMPLOYED IN THE FIGURES

1 Tire
2 Carcass
3 Sidewall
4 Crown
5 Beads
6 Tread
7 Bead wires
8 Sealing layer
10 Crown reinforcing element
11 Reinforcing thread or cord
12 Reinforcing strip made of thermoplastic film
13 Matrix (elastomer mixture, preferably diene elastomer mixture)
14 Composite reinforcing strip (thermoplastic film and reinforcing threads)
15 Matrix (elastomer mixture, preferably diene elastomer mixture)
20 Crossed triangulation layer
21 Crossed triangulation layer
22 Belt

The invention claimed is:

1. A tire comprising:
   a carcass ply;
   two beads;
   two sidewalls;
   a tread; and
   a crown reinforcing zone,
   wherein the carcass ply connects the two beads by way of the two sidewalls,
   wherein the crown reinforcing zone is positioned radially external to the carcass ply and radially internal to the tread,
   wherein the crown reinforcing zone includes a plurality of reinforcing strips disposed in at least a first row and a second row such that:
      the first row is positioned radially internal to the second row, and
      the reinforcing strips of the first row and second row are disposed in a substantially circumferential direction, with the reinforcing strips of the first row being disposed in a staggered manner relative to the reinforcing strips of the second row,
   wherein the reinforcing strips of the first and second rows are coated in an elastomeric composition and are separated by bridges of the elastomeric composition,
   wherein a mean overlap between the reinforcing strips of the first row and second row is greater than 40%, and
   wherein the reinforcing strips are made of a thermoplastic film having a modulus greater than 0.9 GPa in a main direction and in a transverse direction.

2. The tire according to claim 1, wherein the modulus of the thermoplastic film is greater than 2 GPa.

3. The tire according to claim 1, wherein an aspect ratio of the thermoplastic film is greater than or equal to 5.

4. The tire according to claim 1, wherein the thermoplastic film is made of:
   a thermally stabilized, biaxially drawn polyester, or
   a thermally stabilized, monoaxially drawn polyester, or
   a polyamide.

5. The tire according to claim 1, wherein the reinforcing strips are integrated in a matrix made of an elastomeric matrix mixture.

6. The tire according to claim 5, wherein the elastomeric matrix mixture is a diene elastomeric mixture.

7. The tire according to claim 5, wherein the elastomeric matrix mixture has a modulus at 10% elongation in a range of from 3 MPa to 20 MPa.

8. The tire according to claim 5, wherein the elastomeric matrix mixture has a modulus at 10% elongation of greater than 20 MPa.

9. The tire according to claim 5, wherein the matrix includes circumferential filamentary reinforcing elements integrated therein.

10. The tire according to claim 5, wherein an interface between the reinforcing strips and the elastomeric matrix mixture is adhesive.

11. The tire according to claim 1, wherein circumferential filamentary reinforcing elements are integrated in the thermoplastic film forming the reinforcing strips.

12. The tire according to claim 1,
wherein the reinforcing strips are composite strips,
wherein each composite strip includes:
   a strip of thermoplastic film,
   an alignment of reinforcing threads arranged in a vicinity of the strip of thermoplastic film, and
   a matrix of an elastomeric mixture into which the strip of thermoplastic film and the alignment of reinforcing threads are integrated.

13. The tire according to claim 12, wherein the elastomeric mixture is a diene elastomeric mixture.

* * * * *